UNITED STATES PATENT OFFICE.

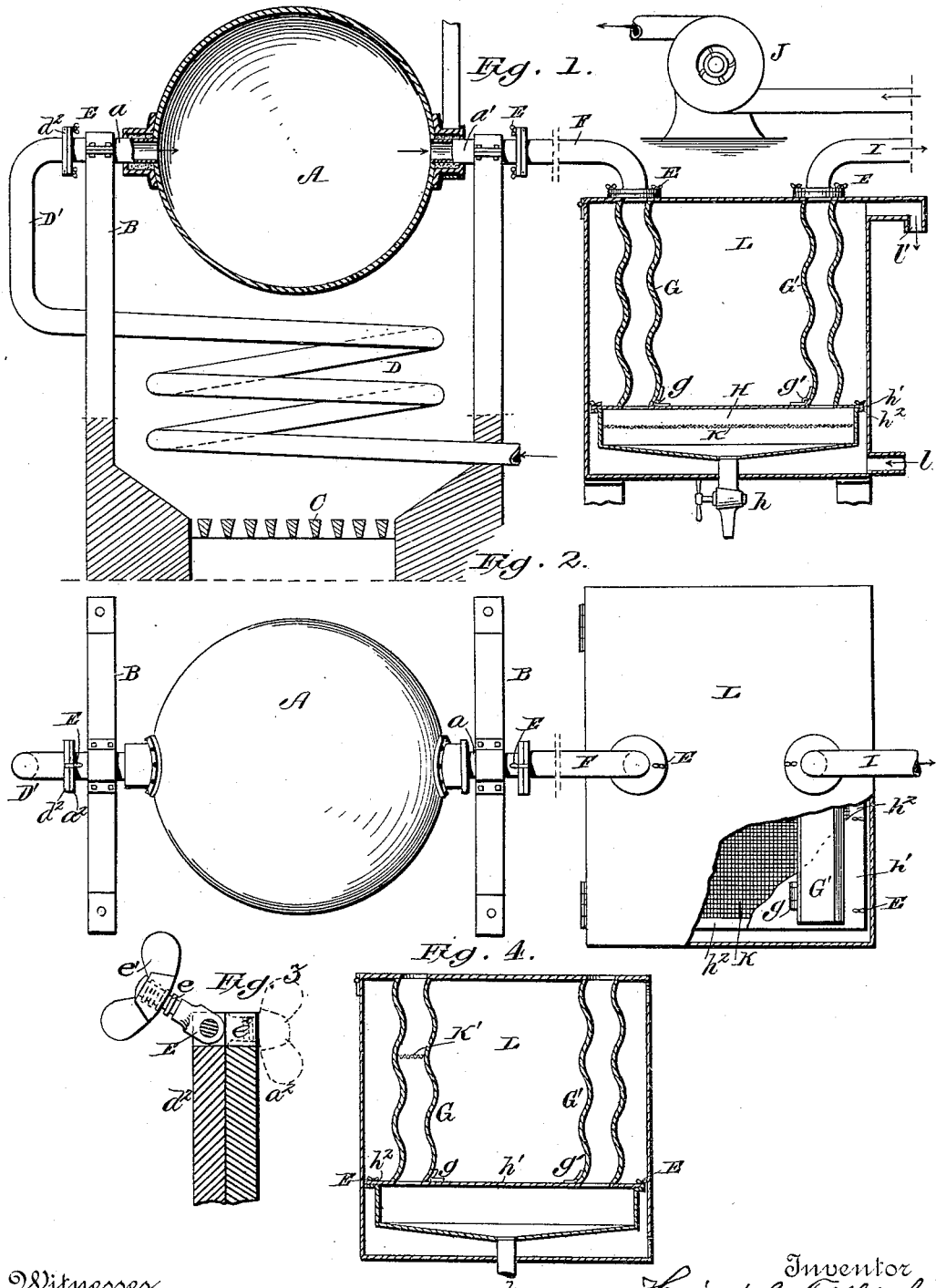

HEINRICH TRILLICH, OF MUNICH, GERMANY, ASSIGNOR TO KATHREINERS MALZKAFFEEFABRIKEN WILHELM & BROUGIER, OF SAME PLACE.

COFFEE-ROASTING APPARATUS.

SPECIFICATION forming part of Letters Patent No. 493,606, dated March 14, 1893.

Application filed December 19, 1892. Serial No. 455,598. (No model.) Patented in England March 9, 1892, No. 15,848.

*To all whom it may concern:*

Be it known that I, HEINRICH TRILLICH, a citizen of the Kingdom of Bavaria, residing at Munich, Bavaria, Germany, have invented a certain new and useful Improvement in the Art of Roasting Coffee, (for which I have received a patent in England, No. 15,848, dated March 9, 1892,) of which the following is a specification.

This invention relates to the art of roasting coffee with particular reference to the recovery of the aromatic vapors which are usually allowed to escape and be wasted.

The object of my invention is to provide means whereby the vapors and gases arising during the roasting process, which contain a considerable percentage of the aromatic oils which give the coffee its peculiar flavor and cheering qualities, and which heretofore have been generally carried off into the furnace or chimney and thus wasted, may be condensed and preserved for various uses, such as imparting a coffee flavor to articles of food, or to flavor sirups used e. g. in connection with soda water-fountains or the condensed oil may be mixed with the roasted coffee, &c. In connection with this it is my further object to simultaneously carry off from the roasting or roasted coffee, the thin skins and hulls, which, as is well known, are separated or generated in roasting, and which, if they remained together with the coffee beans, would impart to the beverage produced therefrom an unpleasant gray and discolored appearance. It is also my object to carry off these skins so as not to be mixed with the condensed volatile oils.

For these purposes an apparatus embodied in my invention involves means for blowing the aromatic vapors together with the skins out of the roaster at a suitable stage of of the roasting process, condensing the vapors and separating the skins from the vapors.

Such apparatus, briefly considered in its preferred form comprises a pipe or duct connecting the interior of the roaster with a blower of any suitable description, a condenser for the aromatic vapors arranged between the roaster and the blower and a screen, strainer, or sieve placed somewhere in, but preferably above, that part of the condenser where the condensed or liquefied aromatic oils are collected, and serving to retain the skins and prevent their access to the collector. The apparatus is preferably so arranged that the skins will be carried out of the condenser by the action of the blower. And the said apparatus, moreover, in its preferred form, contains such further features, details of construction and combination of parts, as will hereinafter be set forth and covered in the claims.

In the accompanying drawings—Figure 1 represents an apparatus embodying what I consider the preferable way of carrying out my invention; Fig. 2, a plan view thereof; Fig. 3, a detail sectional view showing the hinged clamps employed, and Fig. 4, a detail view showing a modified arrangement of the strainer.

In the drawings A, represents a suitable roasting device of spherical or any desired or suitable form, and having pipe sections $a$, $a'$, at diametrically opposite points, which are supported in suitable bearings, B, B, as shown. The coffee is introduced into the roasting device in the usual way and roasted by any suitable heating agent, such as a fire in the hearth, C, located below the roasting drum and it may be agitated by any of the well known means. In addition to this I provide an air heater, preferably in the form of a spiral tube, D, located above the hearth C, so as to be surrounded by the fire therein, the said spiral being removably connected with the pipe-section, $a$, by any suitable device, so as to communicate with the interior of roasting drum A. The preferable mode of connecting the air heating spiral D with the pipe-section $a$, is shown in detail in Fig. 3, where $a^2$ represents a flange on the pipe-section $a$, and $d^2$, a similar flange on the prolongation D', of the spiral D. One of these flanges e. g. $d^2$, is provided at two or more points with hinged clamps E, consisting of screw-bolts $e$, having a thumb-nut $e'$, threaded into its end and adapted to enter corresponding slots $e'$, in the flange $a^2$, when swung into position as indicated in full lines in Figs. 1 and 2, and in dotted lines in Fig.

3, the full lines in Fig. 3, indicating the position of the clamps when swung away to enable the removal of the roasting drum, &c. If necessary any suitable packing may be introduced between the flanges $a^2$ and $d^2$. The other pipe section $a'$ is connected in a similar manner with a pipe F, which leads to a condenser which consists essentially of an exhaust blower or fan communicating with the roasting drum or receptacle A, and a condenser-proper or cooler located between the blower and the roasting receptacle, and is preferably provided with a screen for separating the hulls and skins from the condensed or liquefied aromatic oils obtained in the condenser. In its preferred form this part of the apparatus is constructed as follows: The condenser proper consists of a condensing tube G, preferably made of corrugated sheet-metal and connected with pipe F, by clamps E, as already set forth, a collector H, receiving the end of the collecting-tube and a further condensing tube G', similar in form and structure to the tube G, and leading from the collector H, to the outlet pipe I, connected with a blower or an exhausting apparatus J. The collector H, is preferably provided with an inclined bottom, as shown, which bottom is provided at its lowest point with a cock $h$, for drawing off condensed aromatic oils.

In order to separate the skins or hulls resulting in the roasting process from the condensed aromatic oils, a screen or fine-meshed sieve is suitably interposed between the roaster A, and the collector H, and in the preferred form of apparatus, I place this screen K, horizontally into the collector, H, so as to divide the same into two horizontal compartments, the lower one of which serves to collect the liquefied aromatic oils while the upper one communicates with both condensing tubes G and G', and hence permits the hulls, skins and chaff to be blown out of the collectors at the same time the condensation proceeds. I may sometimes modify this construction as shown at Fig. 4, where the separating screen K' is placed transversely in the inlet condensing tube G. In this construction the hulls and skins are also separated from the condensed oils but they are not carried off by the blower, but must be taken out of the tube G at suitable periods.

In order to obtain access to the interior of the tubes G, G', for the purpose of cleaning and the like, I preferably hinge one or several of their sides, as shown at $g$, $g'$; and in order to gain access to the interior of the collector, H, for similar purposes, and to remove or replace the screen, K, I make the top $h'$, of the said collector to which the condensing tubes G, G' are attached, removable by any suitable means, as for example, by flanging the collector at $h^2$, and securing the top $h'$ thereto by hinged clamps E, such as already described. Of course, the joints between the top $h'$, and the collector and between the hinged and fixed parts of the tubes G, G', are sealed water tight by a suitable means or packing, which at the same time will not be affected by water or injuriously affect the aromatic vapors.

The condenser is preferably placed into a cooler L, which is preferably in the form of a vessel having an inlet orifice at $l$, at the bottom and an outlet orifice $l'$ at the top of the vessel, so that a constant current of cold water may be maintained from the bottom to the top of the cooler.

In the operation of the apparatus thus described, the blower J begins to operate to exhaust the vapors and skins and hulls from the roaster after the coffee has been sufficiently roasted to develop the aromatic vapors. This causes the air to be drawn in through the pipe-section $a$. As this air would otherwise have a chilling effect and arrest the roasting process and the generation of the aromatic oils, the air which enters through the said pipe-section first passes through the air-heating spiral. As they pass into the tube G, they are partially or wholly condensed and the resulting liquid or oil flows into the collector H, while the hulls and skins are arrested and separated therefrom by the screen K, and in the further operation of the blower are swept out through the tube, G', and the outlet pipe I, while any remaining vapors are condensed in their passage upward through tube G'. The corrugated surfaces of the tubes G, G', greatly assist the condensing action. The resulting liquid drawn off through cock $h$ is of a brown color, having a coffee-like odor and an acrid, astringent coffee-like taste. It is neutralized with carbonate of magnesium or calcium, and redistilled to purify the same, the distillate having a pure coffee flavor and smell, and being susceptible of the various industrial uses above indicated.

It is manifest that my process may be carried out in many other ways and that the apparatus shown may be modified in many particulars without departing from the spirit of my invention, and I do not, hence desire to be limited to the matter shown and described, but

What I claim, and desire to secure by Letters Patent, is—

1. In an apparatus for roasting coffee, a roaster and means for exhausting the vapors and skins from the roaster in combination with a condenser and a screen arranged in the condenser and adapted to separate the skins from the liquefied vapors, substantially as set forth.

2. In an apparatus for roasting coffee, a roaster and means for exhausting the vapors and skins from the roaster in combination with a condenser provided with a collector for the liquefied vapors and a screen arranged in the collector between the bottom and top thereof, so as to form a passageway through and out of the condenser through which the skins are exhausted from the condenser, while the liquefied vapors drop through the screen into the bottom of the collector, substantially as set forth.

3. In an apparatus for roasting coffee, a condenser for the vapors from the roaster consisting of a collector and two condensing-tubes communicating with the top thereof in combination with a screen arranged horizontally in the collector and dividing the same into two compartments, substantially as set forth.

4. In an apparatus for roasting coffee, a condenser for the vapors from the roaster consisting of a collector in combination with two condensing-tubes communicating therewith and having corrugated walls, substantially as set forth.

5. In an apparatus for roasting coffee, a condenser for the vapors from the roaster, consisting of a collector having a removable top in combination with condensing-tubes attached to said top and having hinged side walls, substantially as set forth.

In testimony that I claim the foregoing as my invention I have signed my name in presence of two subscribing witnesses.

HEINRICH TRILLICH.

Witnesses:
CARL T. PLETZER,
ALBERT WEICKMANN.